Jan. 26, 1965  S. J. WEISS  3,167,223
RAPID GARMENT FOLDER

Filed Aug. 18, 1964  6 Sheets-Sheet 1

INVENTOR
Samuel Jerome Weiss

BY *Birch & Birch*

ATTORNEYS

Jan. 26, 1965 S. J. WEISS 3,167,223
RAPID GARMENT FOLDER
Filed Aug. 18, 1964 6 Sheets-Sheet 3

INVENTOR
Samuel Jerome Weiss
BY *Birch & Birch*
ATTORNEYS

FIG. 4.

INVENTOR
Samuel Jerome Weiss
BY Birch & Birch
ATTORNEYS

Jan. 26, 1965

S. J. WEISS 3,167,223

RAPID GARMENT FOLDER

Filed Aug. 18, 1964

INVENTOR
Samuel Jerome Weiss

BY Birch & Birch

ATTORNEYS

Jan. 26, 1965  S. J. WEISS  3,167,223

RAPID GARMENT FOLDER

Filed Aug. 18, 1964  6 Sheets-Sheet 6

INVENTOR
Samuel Jerome Weiss
BY Birch & Birch
ATTORNEYS ated Jan. 26, 1965

3,167,223
RAPID GARMENT FOLDER
Samuel Jerome Weiss, P.O. Box 421, Castile, N.Y.
Filed Aug. 18, 1964, Ser. No. 390,299
9 Claims. (Cl. 223—37)

The present invention relates to a garment folding machine and more particularly to a machine for high speed creaseless garment folding of cloth garments, such as sweaters, sport shirts, polo shirts, T shirts and the like which often may be made of soft unmanageable fabrics and is a continuation-in-part of my prior co-pending application, Serial No. 275,275, filed April 14, 1963, now abandoned.

It is an object of this invention to provide an automatic folding machine adapted to eliminate time consuming meticulous manual labor, such as usually required to fold garments with creaseless folds in many garment making factories.

Another object is to provide an automatic machine shirt folding machine of considerable versatility which without adjustment may efficiently fold various size garments, such as T shirts made in small, medium or large sizes.

Still another object is to provide a readily adjustable garment folder, adjustable by the operator to fold particularly small or to fold particularly large garments of varying lengths and widths.

Another object is to provide in a garment folder, automatic means for discharging and conveying the folded garment from the machine and to a folded garment packaging location without manual assistance.

Yet another object is to provide novel foraminous folding members pivotally mounted and highly pervious to air, whereby air cushioning resistance and/or vacuum effect are eliminated to permit high speed folding performance.

A further object is to provide novel foraminous folding members novelly pivoted on offset hinges so as to be in a plane slightly elevated with respect to a folded garment support and discharge panel, whereby said members eliminate crushing, rumpling or creasing of the garment during the folding operation.

The foregoing and other objects and advantages of the present invention will appear more fully hereinafter from the following detailed description, when considered with the accompanying drawings, wherein like parts in the specification are numbered and referred to by like numerals throughout the drawings.

It is to be expressly understood that the drawings, herewith, are for the purposes of illustration only and are not to be construed as defining the scope or limits of the invention, reference being had for this purpose to the appended claims.

Figure 1:
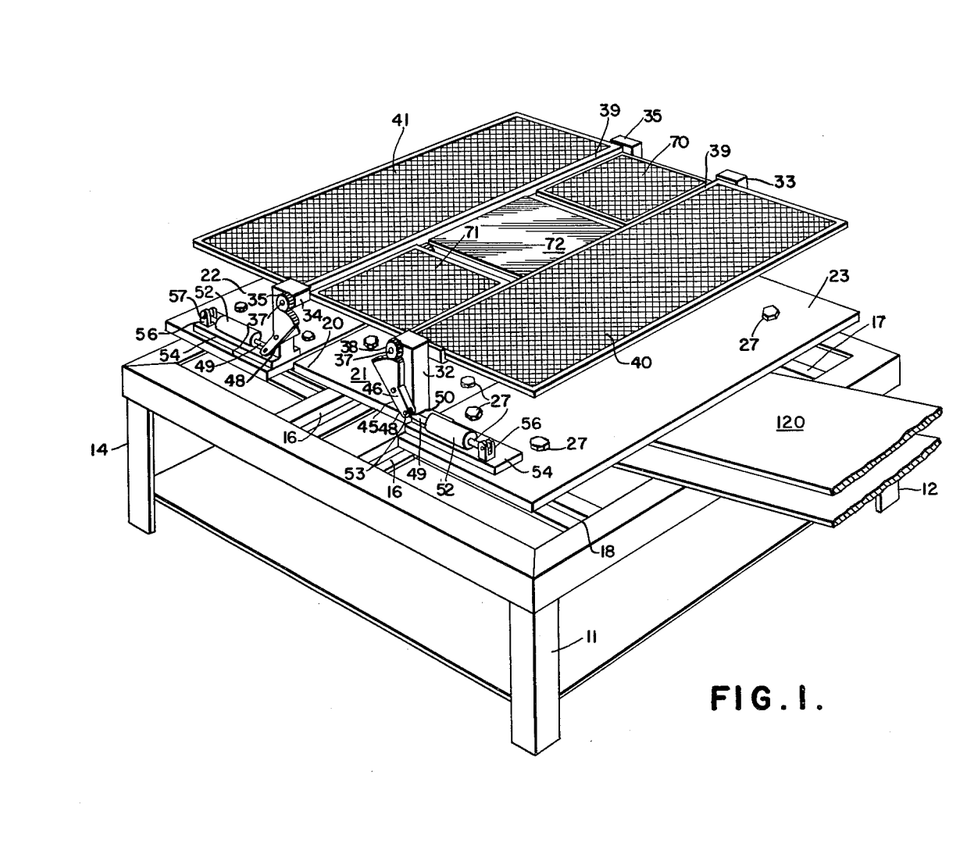
FIGURE 1 is a general isometric view of the present novel garment folding machine.
Figure 2:
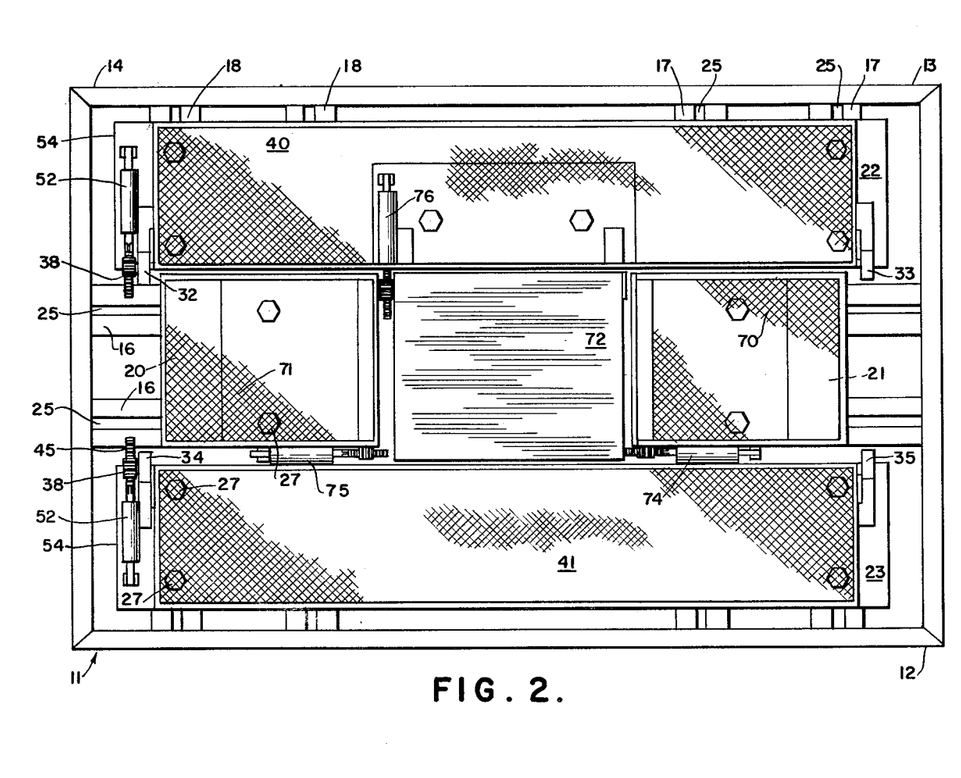
FIGURE 2 is a top plan view of the garment folder with the novel foraminous garment supporting and folder means showing their respective operating means and connections.
Figure 4:
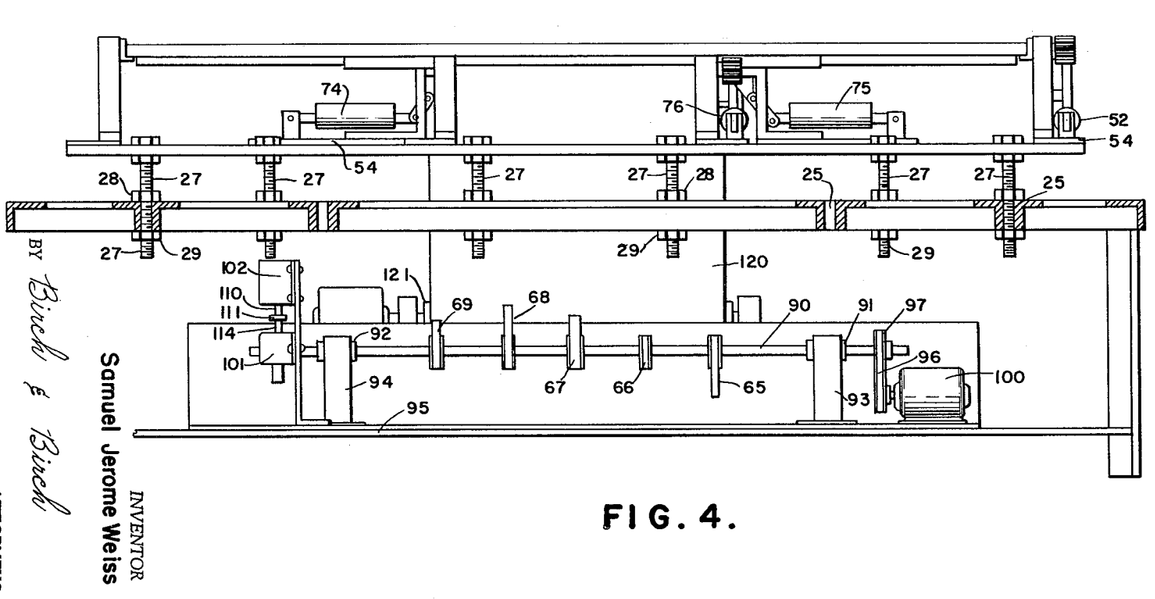
FIGURE 4 is a side view partly in elevation of the garment folding machine taken at random along a longitudinally extending section line thereof.

Referring in detail to the drawings and first with particular reference to FIGURES 1 and 2, the folding machine comprises a main rectangular frame 10 supported at four corners by legs 11, 12, 13 and 14. The frame is reinforced by spaced longitudinally extending longitudinally slotted track or guide members 16—16 and similar slotted transversely extending track members 17—17 and 18—18 arranged with respect to each other in substantially right angled cross track fashion. The track or guide members 16—16 vertically support horizontally positioned and spaced adjustable folder member support plates 20 and 21 and similarly vertically support and position spaced adjustable folder member support plates 22 and 23. As each of these slotted track members are provided with an identical form of elongated slot, each slot of each pair of tracks is generally designated 25. These slots greatly increase versatility of the machine for increased adjustability and are provided to receive the shank portions 26 of suitably proportioned threaded support studs or bolts 27 to adjustably support each of the respectively associated horizontally spaced plates 20–21 or 22–23. Each support stud 27, for example, twelve in number, is adapted to be locked in any vertical or horizontal position thereof in its guide slot 25 of a respective guide track by lock nuts, such as 28 and 29, see FIGURE 4, whereby the support plates are both vertically and horizontally adjustable to regulate the spaced positions of the foraminous folder members, hereinafter described.

Mounted on the upper face of the respective plates 22 and 23 are spaced standards 32 and 33 and 34 and 35, respectively, see FIGURES 1 and 2. Each of the standards 32 and 33 at its top end has a horizontal offset hinge shaft 37 with a pinion gear 38. Each shaft 37 is journalled to turn in the standard and each said hinge shaft is formed as an offset part of the frames 39 at each end of the respective garment support and folder panels. The first side fold panel 40 is journalled to pivot between the spaced apart top ends of the standards 32 and 33 on shaft hinges 37; and the second side fold panel 41 is similarly journalled to pivot between the spaced apart top ends of standards 34 and 35 on its shaft hinges 37, see FIGURE 1.

Each fold panel comprises the frame 39 which holds the foraminous material of each of the side and end fold panels 40, 41 and 70 and 71. This material may be fine wire mesh fabric and when moved the fabric permits ambient air to flow through it thereby eliminating any dashpot resistance to panel movement and any vacuum development between the garment cloth and the folding panels, such as occurs with the solid plate type folding panels of the prior art.

The pinion gears 38 are keyed to the respective offset shaft hinges 37 of the sidefold panels 40 and 41 and are positioned in constant mesh with sector gears 45 formed on the respective peripheral ends of bell-crank levers 46 rotatably mounted on pins 47 intermediately secured to each respective standard 32, 33, 34 and 35. The opposite end of each bell-crank 46 from the sector gear head portion thereof is bifurcated in the provision of a spaced lug arrangement 48 with aligned apertures to receive the apertured reduced end 50 of a piston rod 49 extending from a piston, not shown, in a double-acting fluid power cylinder 52. These double-acting cylinders are each mounted on blocks 54. The reduced apertured end 50 of the piston rod 49 when inserted between the spaced bifurcated lug arrangement 48 of the bell-crank lever 46 is pivotally retained therein by a pivot pin 53, whereby the bell-crank is oscillatable by the reciprocating movements imparted to the piston rod 49 from the double-acting power cylinder 52, see FIGURES 1 and 3.

Figure 3:
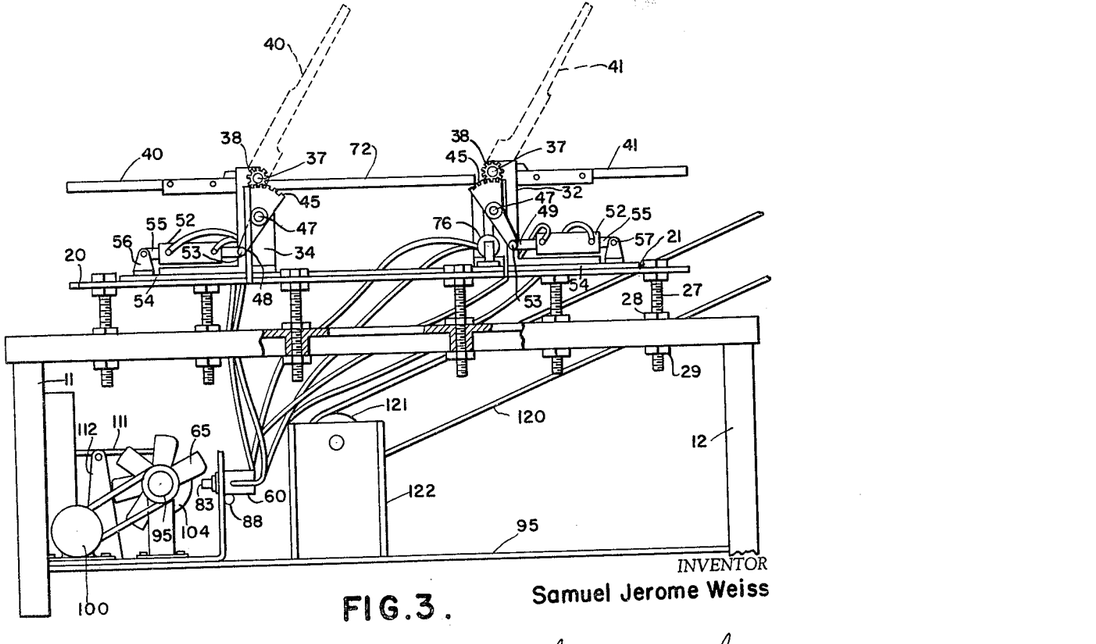
FIGURE 3 is an end view of the folding machine mostly in elevation illustrating the main frame supporting legs and showing an end portion of the operating means and the connections for the foraminous shirt supporting and folding members.

The double-acting cylinder 52 at its opposite end to the bell-crank lever connection is formed with an end apertured lug 55 and is pivotally connected to an upstanding bifurcated lug 56 formed with aligned apertures to receive a pivot pin 57, so as to pivotally mount the cylinder to the support block 54 on an end of each of the respective folder member support plates 22 and 23 extending across each opposite side of the machine, see FIGURES 1, 2 and 3.

Figures 5, 6:
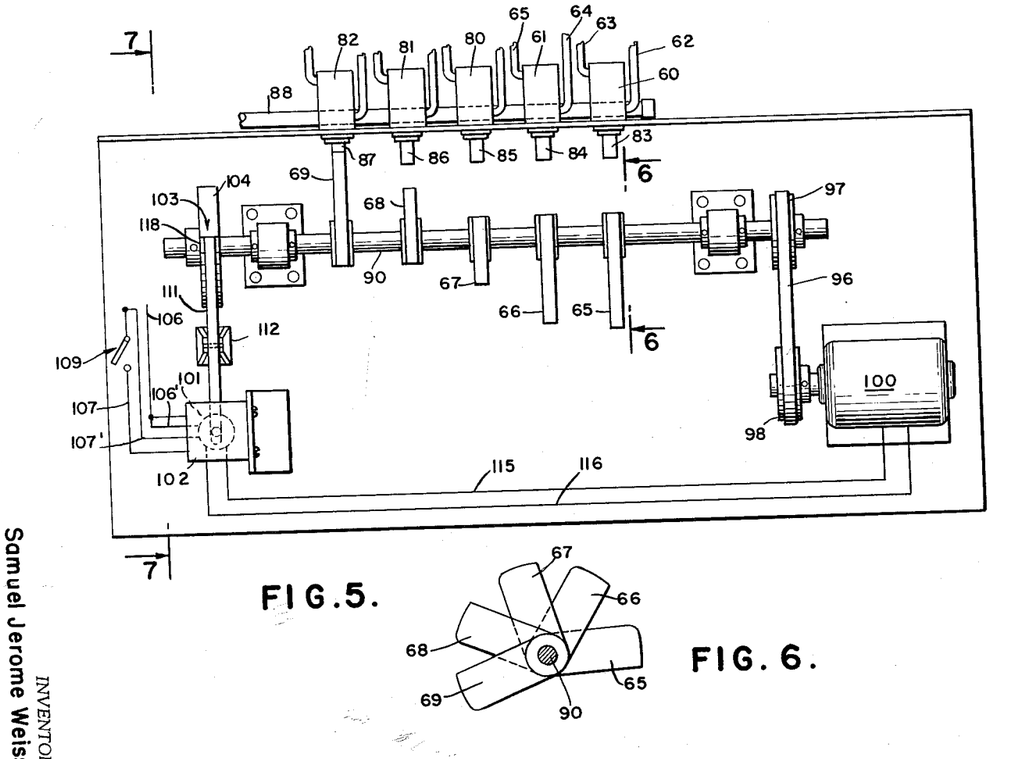
FIGURE 5 is a top plan view of the operating mechanism support platform showing the cams and valves which control the power cylinders of the operating apparatus of the machine, with the upper shirt support table comprised of the foraminous garment folding members and the central discharge panel removed to expose the operating apparatus on the support platform to view to facilitate description and understanding of this phase of the invention.
FIGURE 6 is an end elevation view on line 6—6 of FIGURE 5 disclosing the cam operating positions for timed folding operation of each of the four foraminous garment folder members and the final cam and valve arrangements for the discharge panel operation.

As shown in FIGURE 3, each of these double-acting cylinders 52 for operating the side fold panels 40 and 41 are similarly connected to similar double-acting valves 60 and 61 by conduits 62 and 63, and 64 and 65, see FIGURE 5, one of each respective conduits leading to the double-acting valves 60 and 61 from each side of a piston therein carried by the piston rod 46. The double-acting valves 60 and 61 are selectively controlled in timed relation by cams 65 and 66 which are part of the bank of cams identified in FIGURE 4 by the numerals 65, 66, 67, 68 and 69. The selective timed valve operation of each of these cams will be made clear as the description proceeds and capitulated in the closing paragraphs describing a complete shirt folding operation of the machine, as it programs a complete start to finish garment or shirt folding and discharge operation.

Now with reference to FIGURES 2, 3, 4 and 5, there is shown a substantially similar standard, bell-crank lever and pinion and sector gear operating arrangement for the respective end fold members 70 and 71 and for the centrally located discharge panel 72, see FIGURE 2. The double-acting power cylinder 74 operates the foraminous fold panel 70; the double-acting cylinder 75 operates the fold panel 71; and the double-acting cylinder 76 operates the central discharge panel 72. Each of these respective double-acting cylinders are connected by pairs of conduits to the double-acting valves 80, 81 and 82, respectively. A fluid power supply manifold pipe 88 connects from a fluid power source, such as a compressed air tank, not shown, to each of these double-acting valves, see FIGURE 4.

Each double-acting valve 60, 61, 80, 81 and 82 has a reciprocatable valve stem 83, 84, 85, 86 and 87 projecting in the path of one of the cams 65, 66, 67, 68 and 69 keyed in a predetermined manner to the cam shaft 90. The cam shaft is journalled in bearings 91 and 92 in spaced apart standards 93 and 94 on the platform 95. The cam shaft extends beyond each bearing standard 93 and 94 at each opposite end to provide for a pulley 97 of a power driving connection with a belt 96 at one end with the pulley 98 of an electric motor 100 and for a motor switch 101 and solenoid 102 to control a latch 103 for a cam shaft mounted start and stop cam disk 104 at the opposite end of the cam shaft 90.

A circuit comprised of electric power leads 106 and 107 extending from a suitable source 108 with a pushbutton switch 109 in line 107 suitably connects with the solenoid 102, which solenoid includes an armature 110 that projects in contact with a rock lever 111 pivoted intermediate its ends on the end of a standard 112.

This lever has one end thereof between a thrust button 114 of the motor switch 101 and the projecting part of the armature 110 of the solenoid 102. The said switch 101 has output leads 115 and 116 connected to the field of the motor 100 and input leads 106' and 107' connected to the source 108 at the source side of the pushbuton switch 109. The opposite end of the rock lever 111 has a latch in the form of a right angled lug or dog 117 which normally engages in a detent or notch 118 of the cam disk 104 keyed on the opposite end of the cam shaft 90 from the motor driven pulley 97 thereon.

Mounted in the main frame 10 is one end of an endless conveyor 120. This conveyor extends angularly upward from a sheave 121 journalled in a support 122 in a plane above the apparatus platform 95 to an exterior location outside the main frame, see FIGURE 3. The conveyor 120 has the lower portion thereof below the discharge opening and the central discharge panel 72, so the folded garments, such as folded polo shirts, T shirts and the like will slide from the discharge panel onto the conveyor for transfer to a packaging location.

*Operation*

Figures 8, 9, 10, 11:
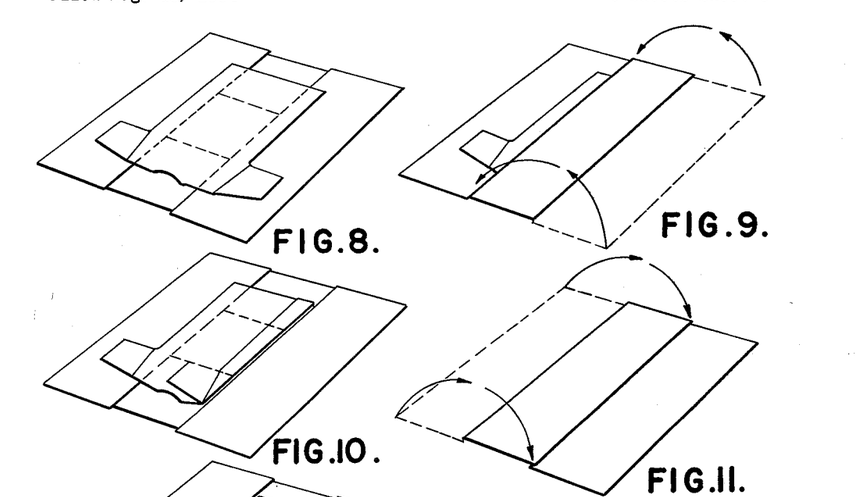
FIGURES 8 through 17, inclusive, illustrate the several folding operations of the four foraminous folding members or panels from start to finish of a garment folding operation from a flat unfolded position to the final folded discharge position of the fifth discharge panel of FIGURE 17.

In operation a shirt S for example, see FIGURE 8, is first laid flat upon the side and end folding members with the body part of the shirt on the center discharge panel.

Figure 7:
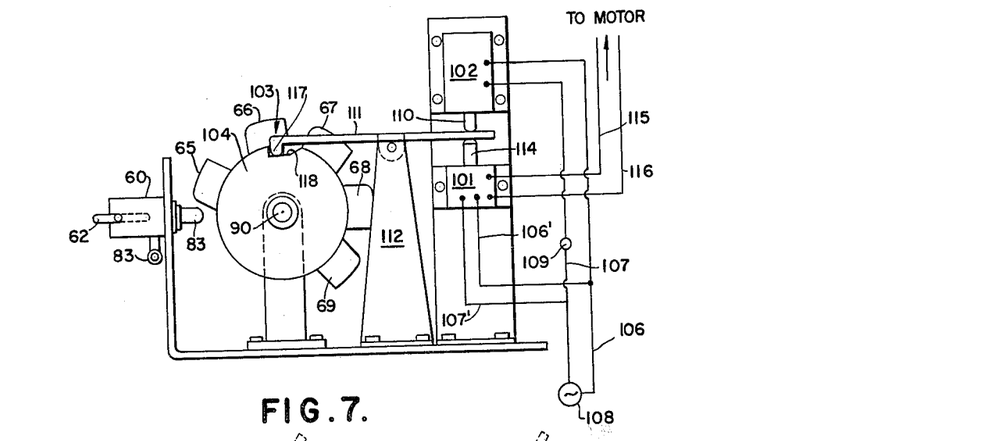
FIGURE 7 is a view taken along the line 7—7 of FIGURE 5 at the opposite end of the machine from line 6—6 of FIGURE 5.

The start of a machine shirt folding operation is simply instituted by the pressing of the pushbutton switch 109, see FIGURE 7, which energizes the solenoid 102 and through its armature 110 closes the motor switch 101, releases the latch 103 of the cam disk 104 and causes the cam shaft 90 to be rotated with the disk for a complete cycle of rotation to fold a shirt and subsequently discharge the folded shirt.

As the cam shaft 90 rotates rotates the bank of cams 65, 66, 67, 68 and 69 are timed to be selectively brought into five valve operating positions to consecutively engage with the respectively associated valve stems 83, 84, 85, 86 and 87 of the double-acting valves 60, 61, 80, 81 and 82 and compressed air is first released by the first valve 60 to one side of the double-acting power cylinder 52 of the first side folding member 40 which folds over one side of the shirt S, see FIGURES 9 and 10, first cam 65 disengages the first valve stem 83 and the first side folding member 40 is returned to its initial position by the inherent reverse action of the double-acting power cylinder 52. Then as the second cam 66 engages the valve stem 84 of the second valve 61 the double acting power cylinder 52 in operating connection with the second side folding member 41, in like manner, folds over the opposite side of the shirt into position over the center panel 72, see FIGURES 11 and 12 and returns the said second side folding member to its initial position.

Figures 12, 13, 14, 15, 16, 17:
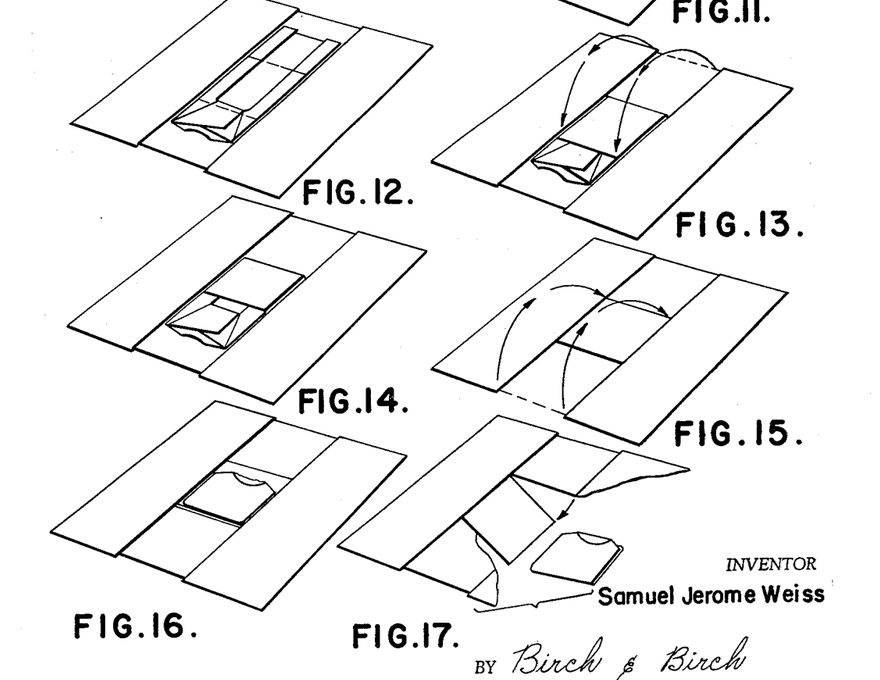

Then as the cam shaft 90 continues its cycle of rotation the third positioned cam 67 engages the third double-acting valve's actuator stem 85 and the first end folding member 70, in like manner, folds over the neck and shoulder portion of the shirt S to a position over the center panel 72, see FIGURES 13 and 14 and returns the said first end folding member 70 to its initial position. Then a double-acting power cylinder 75 operatively geared to the second end folding means 71 is actuated by the fourth positioned cam 68 as it engages the valve stem 86 of the fourth double-acting valve 81, see FIGURES 15 and 16, and in like manner folds over the tail portion of the shirt S and subsequently returns to its initial position. Finally the fifth cam 69 engages the fifth valve stem 87 of the fifth double-acting valve 82 and the respectively associated double-acting power cylinder 76 with its bell-crank and gear connections swings the discharge panel 72 downwardly toward the lower pick up end of the conveyor 120, thereby sliding the folded shirt onto the conveyor and subsequently the discharge panel 72 is returned to its initial position by the double-action of the valve 82 and cylinder 76. Simultaneously the notch 118 in cam disk 104 on cam shaft 90 returns to its machine start position and the dog 117 drops into the notch and releases the motor switch 101 to deenergize the motor 100 and stop the machine.

The folding machine is thus returned to rest position and is ready for a repeat cycle of the folding apparatus when the pushbutton 109 is again pushed to activate the solenoid 102 to motor switch closing position.

Thus there is provided a novel garment folding machine for articles such as described which is entirely automatic once it is started from the start to the finsh of a folding cycle, including the final conveyance and transportation to a packaging area of the folded merchandise.

Without further description it is believed that the advantages of the present invention over the prior art are apparent and while only one embodiment of the same is illustrated, it is to be expressely understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. A shirt folding machine comprising:
    (1) a main rectangular frame;
    (2) legs supporting each corner of the main frame;
    (3) a platform secured between the legs at an intermediate position thereof;
    (4) machine operating mechanism secured to said platform;
    (5) track means extending transversely and longitudinally in cruciform relation at the top of the said rectangular frame;
    (6) said track means each having elongated slots;
    (7) horizontal support plates in vertically spaced relation above the top of said frame in a horizontal plane above said track means;
    (8) vertical and horizontally adjustable studs secured to said track means and to each respective horizontal support plates;
    (9) said studs being threaded and secured in any desired vertical or horizontal adjusted position by vertically spaced fasteners threadable on the said studs engageable with upper and lower sides of each track means;
    (10) horizontally spaced pairs of standards supported on opposite corners of each of said spaced horizontal support plates;
    (11) first and second side and first and second end foraminous shirt supporting and folding means pivotally journalled between the upper ends of each spaced pair of standards above each of said support plates;
    (12) a pivoted rectangular centrally located folded shirt support and discharge plate bounded on each side by one of said respective horizontally spaced foraminous folding means;
    (13) a hinge shaft carried by each end of said folding means journalled in said standards with the end projecting laterally therefrom;
    (14) a pinion gear keyed to the projected journalled end of each hinge shaft;
    (15) said central support plate being pivotally mounted to swing downwardly into the interior of the main rectangular frame;
    (16) said machine operating mechanism including a driven cam shaft;
    (17) a gang of predeterminedly arranged valve operating cam members secured thereon;
    (18) a drive for rotating said cam shaft;
    (19) double-acting valve means selectively controlled by each cam member operable to fluid supply positions from a suitable source of fluid supply;
    (20) said respective double-acting valves each having a valve actuator means engaged by each of said respective valve operating cam members;
    (21) a fluid operated double-acting power cylinder mounted adjacent each standard on each horizontal support plate;
    (22) a vertical bell-crank lever intermediately pivoted to each respective standard;
    (23) each bell-crank lever including a sector gear at one end in mesh with one of said pinion gears;
    (24) a bifurcated piston rod connected at the other end;
    (25) said bifurcated end being connected to a piston rod from said double-acting power cylinder;
    (26) conduit means from each double-acting valve to each of the respective double-acting power cylinders;
    (27) conduit means from a suitable source of fluid to said respective double-acting valves;
    (28) said cam members programming the timed operation of each of said double-acting valves by said cam means to pivot said first side foraminous shirt support folding means to first fold one side and sleeve of a shirt from a flat spread out unfolded starting position on said foraminous side onto said central discharge plate, said second of said cam members further programming a second double-acting valve to said second side foraminous folding means to secondly fold the opposite side and sleeve of said shirt over and onto said central discharge plate, a third of said cam members next programming a third double-acting valve to said first end formaninous folding means to fold the neck and shoulder portion of said shirt over and onto said central discharge plate, a fourth of said cam members next programming a fourth double-acting valve to the second end foraminous folding means to fold the tail portion of said shirt garment over and onto said central discharge plate, and a fifth of said cam members next programming a fifth double-acting valve to finally downwardly pivot said central discharge panel with the folded shirt thereon for discharge of the folded shirt from the machine to a location exterior of the said rectangular frame.

2. A shirt folding machine comprising:
    (1) a main rectangular frame;
    (2) legs supporting each corner of the main frame;
    (3) a platform secured between the legs at an intermediate position thereof;
    (4) machine operating mechanism secured to said platform;
    (5) track means extending tranversely and longitudinally in cruciform relation at the top of the said rectangular frame;
    (6) said track means each having elongated slots;
    (7) horizontal support plates in vertically spaced relation above the top of said frame in a horizontal plane above said track means;
    (8) vertical and horizontally adjustable studs secured to said track means and to each respective horizontal support plates;
    (9) said studs being threaded and secured in any desired vertical or horizontal adjusted position by vertically spaced fasteners threadable on the said studs engageable with upper and lower sides of each track means;
    (10) horizontally spaced pairs of standards supported on opposite corners of each of said spaced horizontal support plates;
    (11) first and second side and first and second end foraminous shirt supporting and folding means pivotally journalled between the upper ends of each spaced pair of standards above each of said support plates;
    (12) a pivoted rectangular centrally located folded shirt support and discharge plate bounded on each side by one of said respective horizontally spaced foraminous folding means;

(13) a hinge shaft carried by each end of said folding means journalled in said standards with the end projecting laterally therefrom;
(14) a pinion gear keyed to the projected journalled end of each hinge shaft;
(15) said central support plate being pivotally mounted to swing downwardly into the interior of the main rectangular frame;
(16) said machine operating mechanism including a driven cam shaft;
(17) a gang of predeterminedly arranged valve operating cam members secured thereon;
(18) a drive for rotating said cam shaft;
(19) double-acting valve means selectively controlled by each cam member operable to fluid supply positions from a suitable source of fluid supply;
(20) said respective double-acting valves each having a valve actuator means engaged by each of said respective valve operating cam members;
(21) a fluid operated double-acting power cylinder mounted adjacent each standard on each horizontal support plate;
(22) a vertical bell-crank lever intermediately pivoted to each respective standard;
(23) each bell-crank lever including a sector gear at one end in mesh with one of said pinion gears;
(24) a bifurcated piston rod connected at the other end;
(25) said bifurcated end being connected to a piston rod from said double-acting power cylinder;
(26) conduit means from each double-acting valve to each of the respective double-acting power cylinders;
(27) conduit means from a suitable source of fluid to said respective double-acting valves;
(28) said cam members programming the timed operation of each of said double-acting valves by said cam means to pivot said first side foraminous shirt support folding means to first fold one side and sleeve of a shirt from a flat spread out unfolded starting position on said foraminous side onto said central discharge plate, said second of said cam members further programming a second double-acting valve to said second side foraminous folding means to secondly fold the opposite side and sleeve of said shirt over and onto said central discharge plate, a third of said cam members next programming a third double-acting valve to said first end foraminous folding means to fold the neck and shoulder portion of said shirt over and onto said central discharge plate, a fourth of said cam members next programming a fourth double-acting valve to the second end foraminous folding means to fold the tail portion of said shirt garment over and onto said central discharge plate and a fifth of said cam members next programming a fifth double-acting valve to finally downwardly pivot said central discharge panel with the folded shirt thereon for discharge of the folded shirt from the machine to a location exterior of the said rectangular frame;
(29) and a conveyor means below said discharge panel partially within the said main frame to receive the folded shirts discharged thereon by said discharge panel following each successive folding operation of the machine, said conveyor means leading to a location exterior of said main frame.

3. A shirt folding machine comprising:
(1) a main rectangular frame;
(2) legs supporting each corner of the main frame;
(3) a platform secured between the legs at an intermediate position thereof;
(4) machine operating mechanism secured to said platform;
(5) track means extending transversely and longitudinally in cruciform relation at the top of the said rectangular frame;
(6) said track means each having elongated slots;
(7) horizontal support plates in vertically spaced relation above the top of said frame in a horizontal plane above said track means;
(8) vertical and horizontally adjustable studs secured to said track means and to each respective horizontal support plates;
(9) said studs being threaded and secured in any desired vertical or horizontal adjusted position by vertically spaced fasteners threadable on the said studs engageable with upper and lower sides of each track means;
(10) horizontally spaced pairs of standards supported on opposite corners of each of said spaced horizontal support plates;
(11) first and second side and first and second end foraminous shirt supporting and folding means pivotally journalled between the upper ends of each spaced pair of standards above each of said support plates;
(12) a pivoted rectangular centrally located folded shirt support and discharge plate bounded on each side by one of said respective horizontally spaced foraminous folding means;
(13) a hinge shaft carried by each end of said folding means journalled in said standards with the end projecting laterally therefrom;
(14) a pinion gear keyed to the projected journalled end of each hinge shaft;
(15) said central support plate being pivotally mounted to swing downwardly into the interior of the main rectangular frame;
(16) said machine operating mechanism including a driven cam shaft;
(17) a gang of predeterminedly arranged valve operating cam members secured thereon;
(18) a drive for rotating said cam shaft;
(19) double-acting valve means selectively controlled by each cam member operable to fluid supply positions from a suitable source of fluid supply;
(20) said respective double-acting valves each having a valve actuator means engaged by each of said respective valve operating cam members;
(21) a fluid operated double-acting power cylinder mounted adjacent each standard on each horizontal support plate;
(22) a vertical bell-crank lever intermediately pivoted to each respective standard;
(23) each bell-crank lever including a sector gear at one end in mesh with one of said pinion gears;
(24) a bifurcated piston rod connected at the other end;
(25) said bifurcated end being connected to a piston rod from said double-acting power cylinder;
(26) conduit means from each double-acting valve to each of the respective double-acting power cylinders;
(27) conduit means from a suitable source of fluid to said respective double-acting valves;
(28) said cam members programming the timed operation of each of said double-acting valves by said cam means to pivot said first side foraminous shirt support folding means to first fold one side and sleeve of a shirt from a flat spread out unfolded starting position on said foraminous side onto said central discharge plate, said second of said cam members further programming a second double-acting valve to said second side foraminous folding means to secondly fold the opposite side and sleeve of said shirt over and onto said central discharge plate, a third of said cam members next programming a third double-acting valve to said first end foraminous folding means to fold the neck and shoulder portion of said shirt over and onto said central discharge plate, a fourth of said cam members next programming a fourth double-acting valve to the second end foraminous folding means to fold the tail portion of said shirt garment over and onto said central discharge plate, and a fifth of said cam members next programming a fifth double-acting valve to finally downwardly pivot said central discharge panel with the folded shirt thereon for discharge of the folded shirt from the machine to a location exterior of the said rectangular frame;

(30) and an electric motor mounted on said intermediate platform for driving said cam shaft to rotate said cam valve operating members;

(31) and a pushbutton switch in the circuit of said motor controlled by the operator of the machine to start said electric motor to rotate said cam shaft, and (32) latch means for stopping said machine.

4. A machine for folding shirts comprising a frame, a table at the top of the frame formed of hinged side and end foraminous panels arranged in rectangular horizontal spaced relation, said end panels being relatively smaller than said side panels in the provision of a centrally located discharge opening, a central non-foraminous panel downwardly movable in said opening, said panels each having elevated offset hinges above the level of said central panel, a conveyor below said central panel in said frame, power means for consecutively pivoting first said side panels to fold the sides of a shirt flat on the table, then said end panels to fold the neck and the tail portions of the shirt over and onto said central panel, and said power means finally pivoting said central panel downwardly to discharge said folded shirt resting thereon below the table onto the said conveyor below said central panel.

5. A machine for folding shirts as described in claim 4, wherein said power means comprises double-acting fluid power means having piston rod connections with gear means to each of said foraminous shirt folding panels and said non-foraminous discharge panel to pivot said panels to and from shirt folding position, a power driven cam shaft, a plurality of radially arranged cam members on said shaft, a plurality of adjacently located double-acting valves each valve being located opposite the path of travel of one of the cam means, said double-acting valves being connected by reversible inlet and outlet conduit means between a fluid power source and a double-acting power cylinder to operate said shirt folding panels and said discharge panel, and latch means rotatable with said cam shaft for unlatching and latching said cam shaft at the start and finish of each shirt folding and shirt folded shirt discharge cycle.

6. A machine for folding shirts comprising a frame, a table positioned above the top of the frame, said table being formed of hinged side and end wire mesh panels arranged in rectangular horizontal spaced relation, said end wire mesh panels being relatively smaller than said side wire mesh panels in the provision of a centrally located discharge opening, a central non-foraminous panel downwardly movable in said opening, said wire mesh panels each having vertically elevated offset hinges above the level of said central panel, double-acting fluid power means for consecutively pivoting and returning to initial position first said side panels to fold the sides of a shirt positioned flat on the table, then pivoting and returning said end wire mesh panels to fold the neck and the tail portions of the shirt over and onto said central panel and said double-acting power means finally pivoting said central panel downwardly to discharge said folded shirt resting thereon below the table onto the said conveyor below said central panel and then returning said central panel to initial horizontal position.

7. Shirt folder apparatus comprising a main support frame with elongated guide means, a table formed of pivoted side and end panels and a central panel; a support plate for each respective side and each respective end panel, said support plates being vertically and horizontally adjustable on said elongated guide means, and a pair of spaced standards supported on each support plate, said side and end panels being respectively pivoted between each respective pair of standards, said plates when adjusted permitting the apparatus to fold particularly small or to fold particularly large shirts and the like of different lengths and widths.

8. Shirt folder apparatus as described in claim 7, wherein the said side shirt folding panels and the said end folding panels are pivoted in a plane elevated with respect to the normal shirt supporting base, to thereby eliminate creasing of the shirt fabric at the fold portions.

9. A shirt folding machine comprising a main frame, an adjustable table portion to support a shirt to be folded, said table being supported above the frame, said table comprising five movable sections, four of said sections being air pervious panels, said air pervious panels being hinged on offset hinge means above and along the perimeter of the fifth panel so the four air pervious panels fold over the upper surface of the fifth panel when pivoted on said hinge means, double-acting power means connected to each of said air pervious panels for folding over and returning said panels to their respective initial positions in timed sequence, first the side portions of the shirt on the table, and then the neck and tail portions of the shirt, onto said fifth panel, and double-acting power means to pivot said fifth panel to discharge the folded shirt from the said table.

References Cited by the Examiner

UNITED STATES PATENTS 2,130,733 9/38 Combarette ___________ 223—37
2,687,832 8/54 Westwood ____________ 223—37

FOREIGN PATENTS 835,289 5/60 Great Britain.

JORDAN FRANKLIN, *Primary Examiner.*